(12) United States Patent
Lepine et al.

(10) Patent No.: US 12,516,699 B2
(45) Date of Patent: Jan. 6, 2026

(54) SUSPENSION BEARING UNIT WITH SEALING PORTION

(71) Applicant: AKTIEBOLAGET SKF, Gothenburg (SE)

(72) Inventors: Thomas Lepine, Tours (FR); Paul Rabourdin, Chambray lès Tours (FR); Jordan Renaudon, Saint Cyr sur Loire (FR); Bruno Montboeuf, Saint-Cyr-sur-Loire (FR)

(73) Assignee: AKTIEBOLAGET SKF, Gothenburg (SE)

( * ) Notice: Subject to any disclaimer, the term of this patent is extended or adjusted under 35 U.S.C. 154(b) by 49 days.

(21) Appl. No.: 18/617,954

(22) Filed: Mar. 27, 2024

(65) Prior Publication Data
US 2025/0305542 A1  Oct. 2, 2025

(30) Foreign Application Priority Data
Apr. 12, 2023 (FR) ........................ 2303607

(51) Int. Cl.
*F16C 19/16* (2006.01)
*F16C 33/80* (2006.01)
*F16C 35/04* (2006.01)

(52) U.S. Cl.
CPC .............. *F16C 33/80* (2013.01); *F16C 19/16* (2013.01); *F16C 35/042* (2013.01); *B60G 2204/418* (2013.01); *F16C 2326/05* (2013.01)

(58) Field of Classification Search
CPC .......... F16C 19/10; F16C 19/14; F16C 19/16; F16C 33/6614; F16C 33/6618;
(Continued)

(56) References Cited

U.S. PATENT DOCUMENTS 8,506,171 B2 * 8/2013 Stautner ............... B60G 15/067
                                                  384/607
9,856,917 B1    1/2018 Vidyasagar et al.
(Continued)

FOREIGN PATENT DOCUMENTS

CN         102434575 A  *  5/2012  .......... B60G 15/068
DE       202010008769 U1    1/2012
(Continued)

OTHER PUBLICATIONS

Preliminary Search Report from the French Patent Office dated Nov. 22, 2023 in related French application No. FR2303607, including Search Report and Written Opinion.
(Continued)

*Primary Examiner* — Phillip A Johnson
(74) *Attorney, Agent, or Firm* — J-TEK LAW PLLC; Scott T. Wakeman; Mark A. Ussai

(57) ABSTRACT

A suspension bearing unit includes a lower support cap, an upper bearing cap that is formed in one piece and has an external skirt, and at least one bearing disposed between the lower support cap and the upper bearing cap. The upper bearing cap further includes at least one sealing portion radially surrounding the bearing and extending towards the lower support cap while being spaced from the lower support cap, and the external skirt radially surrounds the sealing portion of the upper bearing cap. The lower support cap includes at least one shoulder axially below the sealing portion that is defined by a first surface and a second surface of the lower support cap, and the first surface extends at least axially and the second surface extends at least radially and extends radially inwardly from the first surface.

20 Claims, 4 Drawing Sheets

(58) Field of Classification Search
CPC .... F16C 33/80; F16C 35/042; F16C 2326/05; B60G 2204/418
See application file for complete search history.

(56) References Cited

U.S. PATENT DOCUMENTS

| | | | |
|---|---|---|---|
| 10,518,598 | B1 | 12/2019 | Shaikh et al. |
| 11,168,738 | B2 | 11/2021 | Yan et al. |
| 11,958,235 | B2 | 4/2024 | Dudley et al. |
| 2011/0311177 | A1 | 12/2011 | Viault et al. |
| 2013/0277161 | A1 | 10/2013 | Bussit et al. |
| 2015/0247533 | A1 | 9/2015 | Fickert-Guenther et al. |
| 2018/0372152 | A1* | 12/2018 | Gaultier .............. F16C 33/3887 |
| 2021/0222732 | A1 | 7/2021 | Blanchard et al. |
| 2024/0344566 | A1 | 10/2024 | Lepine et al. |

FOREIGN PATENT DOCUMENTS

| | | | |
|---|---|---|---|
| DE | 102012208056 | A1 | 11/2013 |
| DE | 102017204818 | A1 * | 9/2018 ............. F16C 33/80 |
| DE | 102020201404 | A1 | 8/2021 |
| DE | 102020202617 | A1 | 9/2021 |
| EP | 3626486 | A1 | 3/2020 |
| FR | 3103018 | A1 | 5/2021 |
| JP | 2021143734 | A | 9/2021 |

OTHER PUBLICATIONS

Unpublished U.S. Appl. No. 18/617,698, first named inventor: Thomas Lepine, filed Mar. 27, 2024.
Unpublished U.S. Appl. No. 18/617,720, first named inventor: Thomas Lepine, filed Mar. 27, 2024.
Office Action from the United States Patent Office mailed Aug. 11, 2025 in related U.S. Appl. No. 18/617,698.
Office Action from the United States Patent Office mailed Jul. 1, 2025 in related U.S. Appl. No. 18/617,720.

* cited by examiner

SUSPENSION BEARING UNIT WITH SEALING PORTION

TECHNOLOGICAL FIELD

The present invention relates to the field of suspension bearing units used in particular for motor vehicles in the suspension struts of the steered wheels.

BACKGROUND

A suspension bearing unit generally comprises an axial thrust bearing and upper and lower caps forming a housing for the rings of the bearing and providing the interface between the rings and the neighboring elements.

The suspension bearing unit is disposed in the upper part of a suspension strut between a suspension spring and the bodyshell of a vehicle. The suspension spring is mounted around a shock-absorber piston rod, the end of which is connected to the bodyshell of the vehicle. The suspension spring, of the helical spring type, bears axially, directly or indirectly, on the lower cap of the suspension bearing unit.

The suspension bearing unit makes it possible to transmit axial and radial loads between the suspension spring and the bodyshell of the vehicle while still allowing a relative rotational movement between the lower cap and the upper cap arising from a turn of the steered wheels of the vehicle and/or from the compression of the suspension spring.

In general, the upper cap of the suspension bearing unit is provided with a plurality of hooks that are disposed on an external skirt and are designed to diametrically engage with a plurality of hooks of the lower cap. The hooks of each cap are spaced from one another in the circumferential direction.

The hooks form retaining means for axially retaining the upper and lower caps in relation to one another. These hooks also form narrow passages in order to limit the intrusion of contaminating particles radially between the external skirt of the upper cap and the lower cap.

However, such a suspension bearing unit is generally exposed to various types of contamination. Specifically, contaminating particles can easily infiltrate between the external skirt of the upper cap and the lower cap and then be directed towards the bearing and introduced into the latter.

To overcome this drawback, patent application DE-A1-10 2020 201 404 discloses the provision of an external seal which is fixed by clamping between the bearing and the lower cap of the suspension bearing unit and is provided with at least one sealing lip interacting with the upper cap.

SUMMARY

The disclosure is directed to a suspension bearing unit comprising a lower support cap, an upper bearing cap formed in one piece and comprising an external skirt, and at least one bearing disposed between the caps.

According to a general feature, the upper bearing cap moreover comprises at least one sealing portion radially surrounding the bearing and extending towards the lower support cap while remaining at a distance therefrom. The external skirt of the upper bearing cap radially surrounds the sealing portion of the upper bearing cap.

The lower support cap comprises at least one shoulder axially spaced from the sealing portion. The shoulder is formed by first and second surfaces of the lower support cap, the first surface extending at least axially and the second surface extending at least radially and continuing radially inwards from the first surface.

The shoulder of the lower support cap, notably the first surface of the shoulder of the lower support cap, and the external skirt of the upper bearing cap form barriers for stopping and outwardly redirecting a flow of contaminating particles that moves towards the sealing portion of the upper bearing cap.

The sealing portion of the upper bearing cap, situated downstream of the shoulder and the external skirt (relative to a direction of contaminating particles flowing from outside the bearing unit toward the bearing), makes it possible to stop the contaminating particles that move towards the bearing of the bearing unit that might have been able to pass the shoulder and the external skirt.

Advantageously, the sealing portion of the upper bearing cap extends towards the lower support cap so as to form a labyrinth seal with the lower support cap.

The sealing portion of the upper bearing cap, the external skirt of the upper bearing cap and the shoulder of the lower support cap thus form at least one narrow passage between the upper bearing cap and the lower support cap.

Advantageously, the free end of the external skirt of the upper bearing cap is offset axially downwardly with respect to the free end of the sealing portion. This makes it possible to further increase the effectiveness of the external skirt.

"Axially downwards" is understood to mean the axial direction going from the upper bearing cap toward the lower support cap.

Optionally, the free end of the external skirt of the upper bearing cap is offset axially downwardly with respect to the second surface of the shoulder of the lower support cap. This also makes it possible to further increase the effectiveness of the external skirt.

Advantageously, the second surface of the shoulder of the lower support cap extends radially outwards to or beyond the sealing portion of the upper bearing cap.

According to a first design, the second surface of the shoulder of the lower support cap extends both radially outwards and axially downwards.

As a result, the contaminating particles reaching the second surface of the shoulder of the lower support cap are discharged naturally by gravity.

According to an alternative second design, the second surface of the shoulder of the lower support cap extends purely radially.

The sealing portion of the upper bearing cap is preferably annular. Advantageously, the sealing portion of the upper bearing cap extends purely axially. Alternatively, the sealing portion of the upper bearing cap may extend obliquely.

According to a particular design, the first surface of the shoulder of the lower support cap extends purely axially. According to an alternative design, the first surface of the shoulder of the lower support cap extends both radially inwards and axially downwards. According to another alternative design, the first surface of the shoulder of the lower support cap extends both radially outwards and axially downwards.

In a particular embodiment, at least one recess is formed on the sealing portion of the upper bearing cap and is open towards the lower support cap, the recess being filled with lubricant so as to form a seal with the lower support cap.

The recess of the lubricant-filled sealing portion of the upper bearing cap ensures sealing between the sealing portion of the upper bearing cap and the lower support cap by forming a barrier stopping the contaminating particles that move towards the bearing. In addition, the lubricant reduces rubbing between the sealing portion of the upper bearing cap and the lower support cap, thereby reducing the wear of the upper bearing cap and the friction torque of the bearing unit. Advantageously, the sealing portion of the upper bearing cap remains at a distance from the lower support cap. In this case, only the lubricant comes into contact with the lower support cap.

Advantageously, the recess of the sealing portion of the upper bearing cap is annular. This further improves the sealing of the bearing unit insofar as the lubricant can form a bead around 360°. Advantageously, the recess of the sealing portion of the upper bearing cap comprises an axial skirt which radially surrounds the recess. The axial skirt forms a barrier stopping the contaminating particles before they reach the recess of the sealing portion of the upper bearing cap. The service life and the effectiveness of the lubricant are thus improved.

In one embodiment, the recess of the sealing portion of the upper bearing cap is open both radially and axially with respect to the lower support cap, the recess being formed at a free end of the sealing portion of the upper bearing cap.

In a particular embodiment, the unit comprises at least first and second recesses that are formed on the sealing portion of the upper bearing cap and are filled with lubricant, the second recess being axially offset with respect to the first recess toward the side of the upper bearing cap and radially offset with respect to the first recess toward the side of the lower support cap, the first and second recesses immediately following one another in the axial direction. The first and second lubricant-filled recesses further improve the sealing between the sealing portion of the upper bearing cap and the lower support cap.

Advantageously, the upper bearing cap is formed by molding from a single material.

BRIEF DESCRIPTION OF THE FIGURES

The present invention will be better understood on studying the detailed description of embodiments, given by way of non-limiting example and illustrated by the appended drawings, in which.

DETAILED DESCRIPTION

Figure 1:
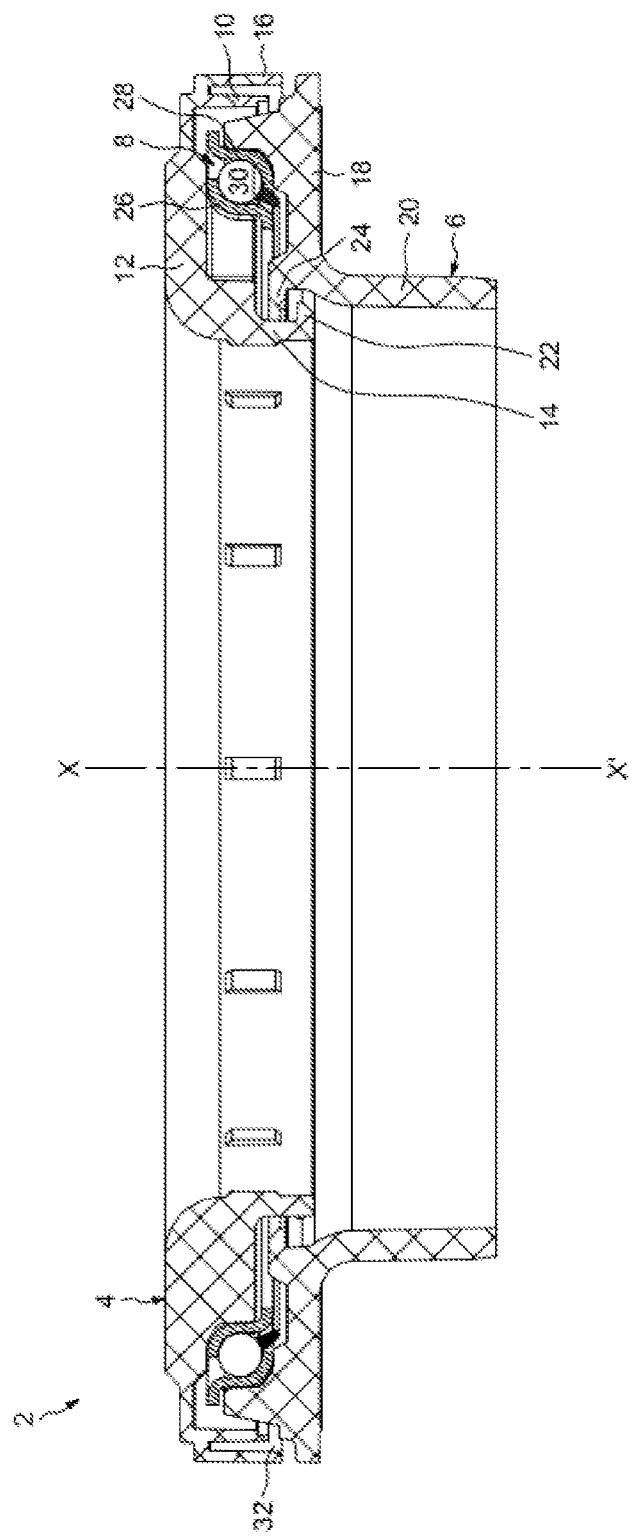
FIG. 1 is an axial sectional view of a suspension bearing unit according to a first exemplary embodiment of the invention.

The suspension bearing unit 2 shown in FIG. 1 is suitable for installation between a cap or upper bearing seat that comes into contact with a fixed chassis element of a motor vehicle and a helical suspension spring. In FIG. 1, the unit 2 is shown in an assumed vertical position.

The unit 2, of axis X-X', comprises an upper bearing cap 4, a lower support cap 6, and a rolling bearing 8 interposed axially between the caps 4, 6. In the example illustrated, the upper bearing cap 4 and the lower support cap 6 are mounted in direct contact with the bearing 8 without an interposed intermediate element. In a variant, the upper bearing cap 4 and the lower support cap 6 may be mounted in indirect contact with the bearing 8 with an interposed intermediate element.

As will be described in more detail later on, the upper bearing cap 4 comprises an annular sealing portion 10 (flange) for preventing the intrusion of contaminants towards the bearing 8. The sealing portion is formed in one piece with the upper bearing cap 4 and extends towards the lower support cap 6.

The upper bearing cap 4 advantageously is formed as a single piece, for example made of plastic, for example such as polyamide (PA) 6.6, which may optionally be reinforced with glass fibers.

The upper bearing cap 4 is, for example, formed by molding from a single material. The upper bearing cap 4 is formed in one piece. The upper bearing cap 4, of axis X-X', comprises a radial portion 12, an annular axial internal skirt 14, and an annular axial external skirt 16 radially surrounding the internal skirt 14. The sealing portion 10 of the upper bearing cap 4 is made in one piece with the radial portion 12 of the upper bearing cap 4.

The radial portion 12 of the upper bearing cap 4 has an upper surface (not provided with a reference sign) intended to face the upper bearing seat and an opposite lower surface (not provided with a reference sign) in contact with the bearing 8. The upper and lower surfaces define the thickness of the radial portion 12 of the upper bearing cap 4. In the example illustrated, the radial portion 12 of the upper bearing cap 4 has a stepped form.

The external skirt 16 of the upper bearing cap 4 partially radially surrounds the lower support cap 6 and extends axially away from the radial portion 12 of the upper bearing cap 4. In the example illustrated, the external skirt 16 of the upper bearing cap 4 extends from a large-diameter edge of the radial portion 12 of the upper bearing cap 4. The external skirt 16 radially surrounds the sealing portion 10 of the upper bearing cap 4.

The internal skirt 14 of the upper bearing cap 4 extends inside the bore of the lower support cap 6. The internal and external skirts 14, 16 of the upper bearing cap 4 extend axially downwards from the radial portion 12 of the upper bearing cap 4. The internal skirt 14 extends from a small-diameter edge of the radial portion 12 of the upper bearing cap 4.

The lower support cap 6, of axis X-X', comprises an annular radial portion 18 in the form of a plate and an annular axial skirt 20 extending from a small-diameter edge of the radial portion 18 of the lower support cap 6. The skirt 20 of the lower support cap 6 extends axially away from the upper bearing cap 4 and the bearing 8. The skirt 20 of the lower support cap 6 makes it possible to center the suspension spring.

The radial portion 18 of the lower support cap 6 has a lower annular radial surface delimiting a bearing surface for the suspension spring.

The upper bearing cap 4 comprises a plurality of internal hooks 22 that are disposed on the internal skirt 14 of the upper bearing cap 4 and extend radially outwards in the direction of the lower support cap 6. In the example illustrated, the hooks 22 are spaced from one another in the circumferential direction. In a variant, it could be possible to provide a single annular hook 22.

The lower support cap 6 comprises a plurality of internal hooks 24 that are disposed on the radial portion 18 of the lower support cap 6 and extend radially inwards in the direction of the upper bearing cap 4, the plurality of internal hooks 24 being designed to diametrically engage with the plurality of internal hooks 22 of the upper bearing cap 4. In a variant, it could be possible to provide a single annular hook 24.

The hooks 22, 24 form retaining means for axially retaining the upper bearing cap 4 and lower support cap 6 in relation to one another.

The bearing 8 is situated entirely radially between the skirts 14, 16 of the upper bearing cap 4. The bearing 8 comprises an upper ring 26 in contact with the upper bearing cap 4, a lower ring 28 in contact with the lower support cap 6, and a row of rolling elements 30, in this case balls, that are disposed between the raceways formed on the rings 26, 28. In the example illustrated, the rolling bearing is of the angular contact type. The upper ring 26 is in contact with the lower surface of the radial portion 12 of the upper bearing cap 4. The lower ring 28 is in contact with an upper surface of the lower support cap 6, and the upper surface has a complementary shape to the lower ring 28 of the bearing 8.

The lower support cap 6 in this case is formed in a single piece, for example made of plastic, for example such as polyamide (PA) 6.6, which may optionally be reinforced with glass fibers.

There is an annular radial space 32 between the lower support cap 6 and the external skirt 16 of the upper bearing cap 4.

The sealing portion 10 of the upper bearing cap 4 is annular and radially surrounds the bearing 8 and an outer surface of the lower support cap 6 while remaining at a distance from the lower support cap 6.

Figure 2:
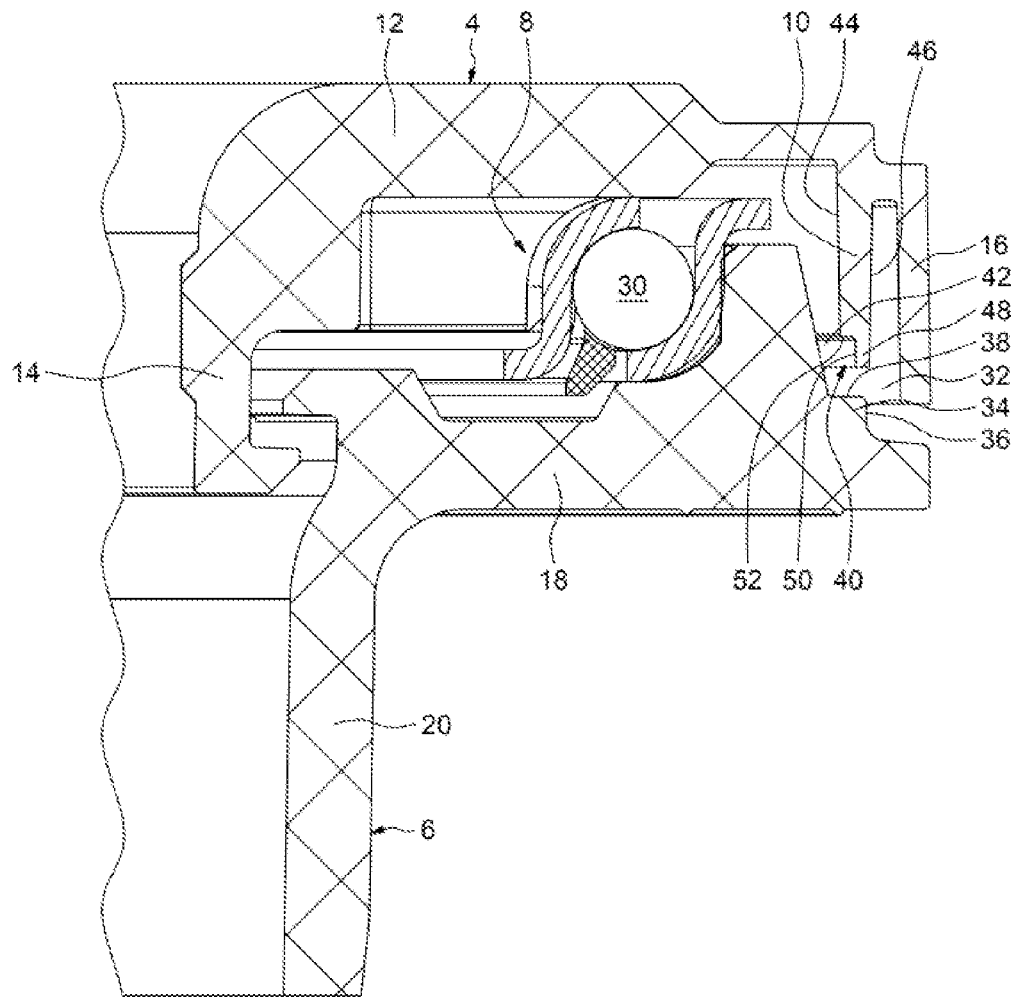
FIG. 2 is a detail view of a portion of FIG. 1

As illustrated more clearly in FIG. 2, the sealing portion 10 of the upper bearing cap 4 extends purely axially towards the lower support cap 6 so as to form a labyrinth seal with the lower support cap 6.

The free end of the external skirt 16 of the upper bearing cap 4 is offset axially downwardly with respect to the free end of the sealing portion 10 of the upper bearing cap 4. The external skirt 16 forms a barrier stopping the contaminating particles that move towards the sealing portion 10 of the upper bearing cap 4.

Moreover, the lower support cap 6 comprises a shoulder 34 axially below the sealing portion 10 of the upper bearing cap 4. In other words, the sealing portion 10 is situated axially above the shoulder 34.

The shoulder 34 of the lower support cap 6 is formed by a first surface 36 extending purely axially and by a second surface 38 extending purely radially. The first surface 36 of the lower support cap 6 extends from a large-diameter edge of the second surface 38 of the lower support cap 6.

There is an annular axial space between the free end of the external skirt 16 and the lower support cap 6. There is an annular radial space between the first surface 36 of the shoulder 34 and the external skirt 16 of the upper bearing cap 4. There is an annular radial space between the sealing portion 10 of the upper bearing cap 4 and the external skirt 16 of the upper bearing cap 4. There is an annular axial space between the second surface 38 of the shoulder 34 and the sealing portion 10 of the upper bearing cap 4. There is an annular radial space between the free end of the sealing portion 10 and the lower support cap 6.

The aforementioned spaces form a labyrinth seal between the upper bearing cap 4 and the lower support cap 6 by forming a succession of narrow passages between the upper bearing cap 4 and the lower support cap 6.

The second surface 38 of the shoulder 34 of the lower support cap 6 in this case is axially aligned with the free end of the external skirt 16 of the upper bearing cap 4.

In a variant, the free end of the external skirt 16 of the upper bearing cap 4 may be offset axially downwardly with respect to the second surface 38 of the shoulder 34 of the lower support cap 6. In other words, the second surface 38 of the shoulder 34 of the lower support cap 6 may be situated axially between the free end of the sealing portion 10 of the upper bearing cap 4 and the free end of the external skirt 16 of the upper bearing cap 4, notably in order to further improve the sealing between the upper bearing cap 4 and the lower support cap 6.

In the exemplary embodiment illustrated, a recess 40 is formed on the sealing portion 10 of the upper bearing cap 4 and is open towards the lower support cap 6. There is an annular space between the recess 40 of the sealing portion 10 and the lower support cap 6. The recess 40 of the sealing portion 10 is filled with a lubricant 42 forming a seal by way of contact with the lower support cap 6. The lubricant 42 comes into contact with the lower support cap 6. The lubricant 42 comprises, for example, grease.

The lubricant 42 filling the recess 40 of the sealing portion 10 ensures good sealing properties between the sealing portion 10 of the upper bearing cap 4 and the lower support cap 6. The lubricant 42 also makes it possible to obtain a bearing unit 2 having a reduced friction torque. The lubricant 42 closes the annular radial space that is between the sealing portion 10 of the upper bearing cap 4 and the lower support cap 6.

The sealing portion 10 of the upper bearing cap 4 extends in this case purely axially from the radial portion 12 of the upper bearing cap 4. In a variant, the sealing portion 10 of the upper bearing cap 4 can extend both axially towards the lower support cap 6 and radially inwards.

The sealing portion 10 of the upper bearing cap 4 is provided with a cylindrical axial inner surface 44 forming a bore and an opposite cylindrical axial outer surface 46. The inner surface 44 and the outer surface 46 delimit the radial thickness of the sealing portion 10 of the upper bearing cap 4.

The first surface 36 of the shoulder 34 of the lower support cap 6 is axially aligned with the outer surface 46 of the sealing portion 10 of the upper bearing cap 4.

The sealing portion 10 of the upper bearing cap 4 comprises an axial skirt 48 radially surrounding the recess 40 of the sealing portion 10, the axial skirt 48 forming a barrier stopping the contaminating particles that pass through the radial space 32 before they reach the recess 40 of the sealing portion 10.

The recess 40 of the sealing portion 10 is annular in this embodiment. The recess 40 is delimited in the radial direction by an annular axial surface 50 of the sealing portion 10 and in the axial direction by an annular radial surface 52 of the sealing portion 10. The annular radial surface 52 extends radially outward from the axial inner surface 44 of the sealing portion 10. The annular axial surface 50 extends axially from a large-diameter edge of the annular radial portion 52 of the sealing portion 10 in the direction of the axial free end of the sealing portion 10. The axial surface 50 delimits the skirt 48 radially on the inner side.

In a variant, the sealing portion 10 of the upper bearing cap 4 may comprise a plurality of recesses 40 open towards the lower support cap 6, each recess 40 extending along a sector which is limited in the circumferential direction, the recesses 40 of the sealing portion 10 being formed at identical or different axial positions.

In the example shown, the recess 40 of the sealing portion 10 is formed at the free axial end of the sealing portion 10 of the upper bearing cap 4, the free axial end being opposite the radial portion 12 of the upper bearing cap 4, the recess 40 of the sealing portion 10 being open both radially inwards and axially towards the lower support cap 6. In a variant, the recess 40 of the sealing portion 10 may be open solely radially inwards with respect to the lower support cap 6.

Figure 3:
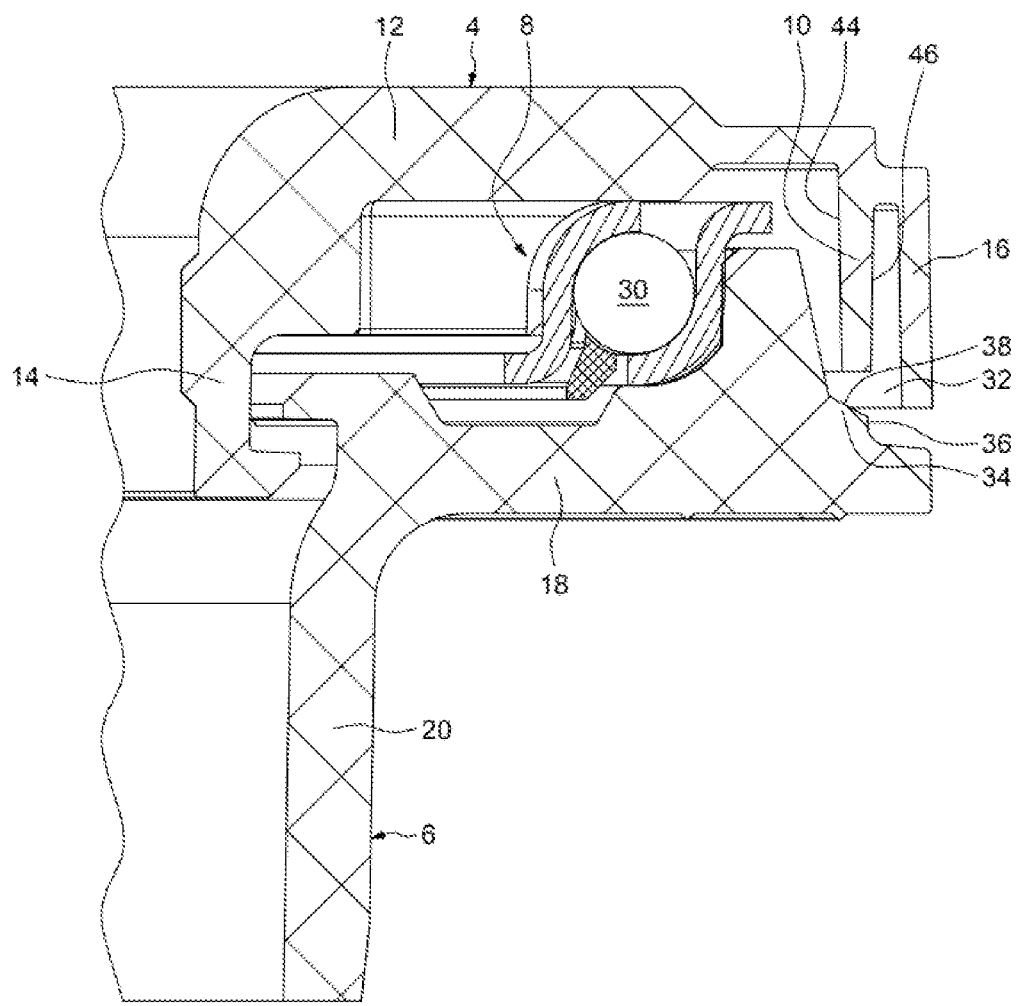
FIG. 3 is a detail view of a suspension bearing unit according to a second exemplary embodiment of the invention.

The exemplary embodiment illustrated in FIG. 3, in which identical elements bear the same references, differs from the first exemplary embodiment in that the sealing portion 10 of the upper bearing cap 4 does not include a recess. Moreover, in this example, the second surface 38 of the shoulder 34 of the lower support cap 6 extends both radially outwards and axially downwards. Optionally, lubricant 42 may be applied between the sealing portion 10 of the upper bearing cap 4 and the outer surface of the lower support cap 6.

Figure 4:
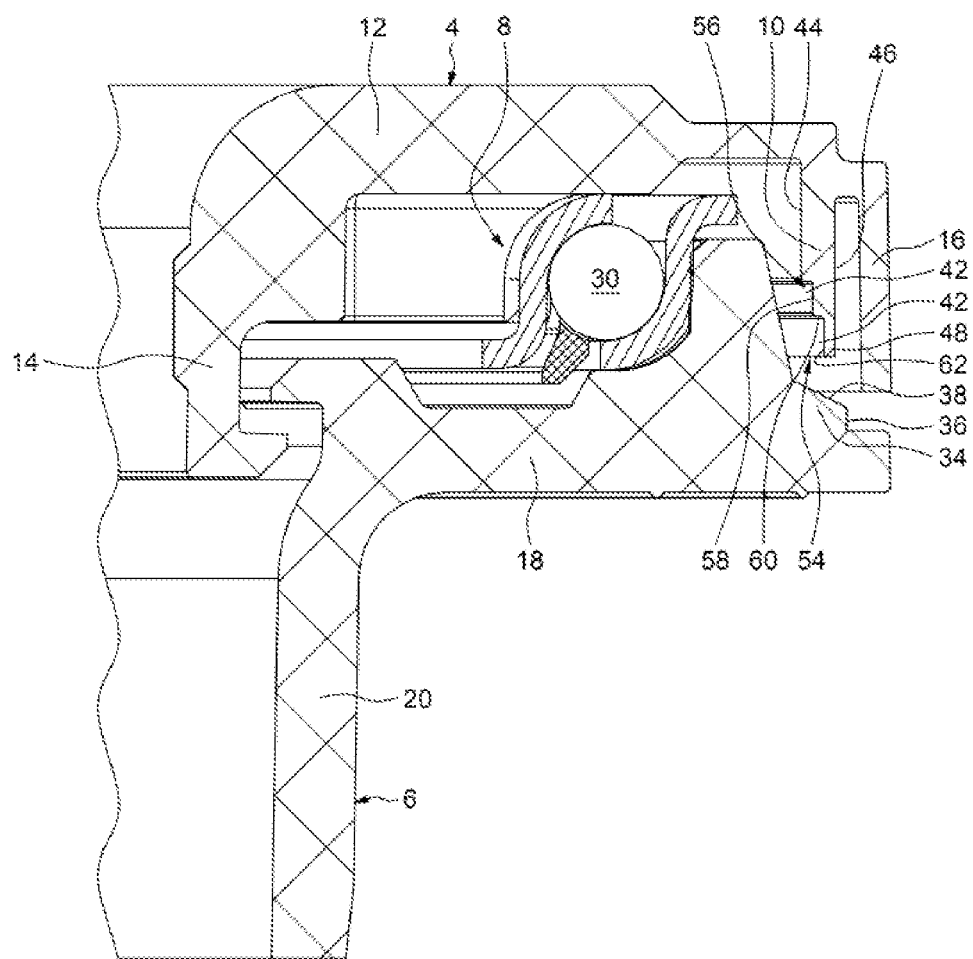
FIG. 4 is a detail view of a suspension bearing unit according to a third exemplary embodiment of the invention.

The exemplary embodiment illustrated in FIG. 4, in which identical elements bear the same references, differs from the first exemplary embodiment in that the second surface 38 of the shoulder 34 of the lower support cap 6 extends radially outwards beyond the sealing portion 10 of the upper bearing cap 4. In other words, the first surface 36 of the shoulder 34 of the lower support cap 6 is offset radially outwardly with respect to the outer surface 46 of the sealing portion 10 of the upper bearing cap 4.

In addition, in this example, the sealing portion 10 of the upper bearing cap 4 comprises a plurality of annular recesses 54, 56 which are open towards the lower support cap 6. A first recess 54 and a second recess 56 are formed on the sealing portion 10 of the upper bearing cap 4 and filled with lubricant 42. The second recess 56 is axially offset with respect to the first recess 54 on the side of the upper bearing cap 4. The second recess 56 is radially offset with respect to the first recess 54 on the side of the lower support cap 6.

The first and second recesses 54, 56 follow one another directly in the axial direction. An annular axial surface 58 of the sealing portion 10 that delimits the second recess 56 in the radial direction extends from an annular radial surface 60 of the sealing portion 10 that delimits the first recess 54 in the axial direction.

An annular axial surface 62 of the sealing portion 10 that delimits the first recess 54 in the radial direction is offset radially outwardly with respect to the axial surface 58 of the sealing portion 10 that delimits the second recess 56 in the radial direction. The axial surface 58 extends axially from a small-diameter edge of the radial surface 60, whereas the axial surface 62 extends axially from a large-diameter edge of the radial surface 60.

In a variant, it is possible for the first and second recesses 54, 56 to not follow one another directly, that is to say to be axially spaced from one another, and/or the sealing portion 10 of the upper bearing cap 4 may comprise more than two recesses.

Moreover, the second surface 38 of the shoulder 34 of the lower support cap 6 extends both radially outwards and axially downwards.

In the exemplary embodiments illustrated, the bearing unit 2 comprises a single external sealing portion 10 situated radially between the support cap 6 and the external skirt 16 of the upper bearing cap 4. In combination, the bearing unit 2 may comprise an internal sealing portion 10 situated radially between the support cap 6 and the internal skirt 14 of the upper bearing cap 4.

In the exemplary embodiments illustrated, the bearing unit 2 comprises a single external sealing portion 10. In a variant, the unit 2 may comprise a plurality of external sealing portions 10.

In the exemplary embodiments illustrated, the first surface 36 of the shoulder 34 of the lower support cap 6 extends purely axially. In a variant, the first surface 36 of the shoulder 34 of the lower support cap 6 may extend both axially downwards and radially inwards or axially downwards and radially outwards.

In the exemplary embodiments illustrated, the lower support cap 6 comprises a single shoulder 34. In a variant, the lower support cap 6 may comprise a plurality of shoulders.

In the exemplary embodiments illustrated, the sealing portion 10 of the upper bearing cap 4 is annular. In a variant, the upper bearing cap 4 may comprise a plurality of sealing portions 10 extending along a sector which is limited in the circumferential direction.

In the exemplary embodiments illustrated, the bearing unit 2 comprises an angular contact rolling bearing 8 provided with a row of balls. The bearing unit 2 may comprise other types of rolling bearings, for example a four-point contact bearing and/or a bearing having at least two rows of balls. The rolling bearing may comprise other types of rolling elements 30, for example rollers. In another variant, the bearing of the unit 2 may comprise a sliding bearing devoid of rolling elements and provided with one or more rings.

The invention claimed is:

1. A suspension bearing unit comprising:
    a lower support cap,
    an upper bearing cap formed in one piece and including an external skirt, and
    at least one bearing disposed between the lower support cap and the upper bearing cap,
    wherein the upper bearing cap further includes at least one sealing portion radially surrounding the bearing and extending towards the lower support cap while being spaced from the lower support cap,
    wherein the external skirt radially surrounds and is radially spaced from the sealing portion of the upper bearing cap,
    wherein the lower support cap includes an annular flange axially spaced from a free axial end of the external skirt, the annular flange having a cylindrical outer wall delimiting a maximum diameter of the lower support cap,
    wherein an upper surface of the annular flange has a first end at an upper end of the cylindrical outer wall and a second end radially inward of the first end,
    wherein the lower support cap includes a shoulder having a first surface having a first end at the second end of the upper surface of the annular flange and a second end axially spaced from the first end and a second surface having a first end at the second end of the first surface and a second end located radially inward of the first end of the second surface, and
    wherein a lower axial end of the sealing portion faces the second wall of the shoulder.

2. The suspension bearing unit according to claim 1, wherein the first surface of the shoulder and a cylindrical radially outer wall of the sealing portion lie on a same cylinder.

3. The suspension bearing unit according to claim 2, wherein the sealing portion extends towards the lower support cap and forms a labyrinth seal with the lower support cap.

4. The suspension bearing unit according to claim 2, wherein a free end of the external skirt is offset axially downwardly with respect to the lower axial end of the sealing portion.

5. The suspension bearing unit according to claim 2, wherein a free end of the external skirt is offset axially downwards with respect to the second surface of the shoulder.

6. The suspension bearing unit according to claim 2, wherein the sealing portion extends towards the lower support cap and forms a labyrinth seal with the lower support cap,
wherein the lower axial end of the external skirt is offset axially downwardly with respect to a free end of the sealing portion,
wherein the sealing portion of the upper bearing cap is annular,
wherein at least one recess is formed in the lower axial end of the sealing portion and is open towards the lower support cap, and
wherein the at least one recess is filled with lubricant.

7. The suspension bearing unit according to claim 1, wherein the second surface of the shoulder extends radially outwards beyond the sealing portion.

8. The suspension bearing unit according to claim 1, wherein the second surface of the shoulder extends radially outwards and axially downwards.

9. The suspension bearing unit according to claim 1, wherein the sealing portion of the upper bearing cap is annular.

10. The suspension bearing unit according to claim 1, wherein the sealing portion of the upper bearing cap extends purely axially.

11. The suspension bearing unit according to claim 1, wherein at least one recess is formed in the lower axial end of the sealing portion and is open towards the lower support cap.

12. The suspension bearing unit according to claim 11, the at least one recess is filled with lubricant to form a seal with the lower support cap.

13. The suspension bearing unit according to claim 1, wherein the upper bearing cap is formed by molding from a single material.

14. The suspension bearing unit according to claim 1, wherein the first surface of the shoulder extends purely axially.

15. The suspension bearing unit according to claim 14, wherein the second surface of the shoulder extends purely radially.

16. The suspension bearing unit according to claim 1, wherein the lower support cap includes a conical wall extending radially inward and axially upward from the second end of the second surface of the shoulder.

17. The suspension bearing unit according to claim 16, wherein the sealing portion comprises an annular wall that extends toward the lower support cap, and
wherein the lower axial end of the sealing portion includes at least one recess, and
wherein the at least one recess has a first surface facing the conical wall and a second surface facing the second surface of the shoulder.

18. The suspension bearing unit according to claim 17, wherein the at least one recess is filled with lubricant to form a seal with the lower support cap.

19. The suspension bearing unit according to claim 17, wherein the first surface of the shoulder extends purely axially.

20. The suspension bearing unit according to claim 19, wherein the second surface of the shoulder extends purely radially.

* * * * *